(12) United States Patent
Emrich

(10) Patent No.: US 9,193,279 B2
(45) Date of Patent: Nov. 24, 2015

(54) VEHICLE SEAT, IN PARTICULAR MOTOR VEHICLE SEAT

(75) Inventor: Holger Emrich, Erdesbach (DE)

(73) Assignee: KEIPER GmbH & Co. KG, Kaiserslautern (DE)

(*) Notice: Subject to any disclaimer, the term of this patent is extended or adjusted under 35 U.S.C. 154(b) by 28 days.

(21) Appl. No.: 14/128,326

(22) PCT Filed: Jun. 15, 2012

(86) PCT No.: PCT/EP2012/061488
§ 371 (c)(1),
(2), (4) Date: Feb. 18, 2014

(87) PCT Pub. No.: WO2012/175428
PCT Pub. Date: Dec. 27, 2012

(65) Prior Publication Data
US 2014/0217794 A1 Aug. 7, 2014

(30) Foreign Application Priority Data
Jun. 21, 2011 (DE) .................. 10 2011 105 360

(51) Int. Cl.
B60N 2/06 (2006.01)
B60N 2/08 (2006.01)
B60N 2/20 (2006.01)
B60N 2/225 (2006.01)
B60N 2/22 (2006.01)

(52) U.S. Cl.
CPC ............. *B60N 2/0881* (2013.01); *B60N 2/20* (2013.01); *B60N 2/22* (2013.01); *B60N 2/2252* (2013.01)

(58) Field of Classification Search
USPC .................. 297/340, 341, 378.12, 378.14
See application file for complete search history.

(56) References Cited

U.S. PATENT DOCUMENTS

| | | | |
|---|---|---|---|
| 4,394,048 A * | 7/1983 | Sakurai et al. | 297/378.12 X |
| 5,597,206 A * | 1/1997 | Ainsworth et al. | 297/378.12 |
| 6,641,218 B2 | 11/2003 | Ito et al. | |
| 6,799,801 B2 | 10/2004 | Niimi et al. | |
| 7,490,907 B2 * | 2/2009 | Nagura et al. | 297/378.12 X |
| 7,533,937 B2 * | 5/2009 | Becker et al. | 297/378.14 |
| 8,376,459 B2 * | 2/2013 | Kumazaki et al. | 297/341 |
| 8,632,128 B2 * | 1/2014 | Omori | 297/341 |
| 2002/0105215 A1 | 8/2002 | Ito et al. | |
| 2003/0025373 A1 * | 2/2003 | Shinozaki | 297/340 |

(Continued)

FOREIGN PATENT DOCUMENTS

| | | |
|---|---|---|
| DE | 197 15 764 A1 | 10/1998 |
| DE | 199 28 148 A1 | 1/2001 |
| DE | 20 2009 016 989 U1 | 4/2010 |
| DE | 10 2008 061 037 B3 | 5/2010 |

(Continued)

Primary Examiner — Rodney B White
(74) Attorney, Agent, or Firm — McGlew and Tuttle, P.C.

(57) ABSTRACT

A vehicle seat, in particular a motor vehicle seat, includes a seat part (3), a backrest (4) attached to the seat part (3) to pivot about a backrest axis (L), seat rails (9) for adjusting the seat length position of the vehicle seat (1), which rails are provided on the seat part (3), a control lever (30) for unlocking the seat rails (9) that is pivotably mounted on the seat part (3), and an unlocking cam (40) for acting on the control lever (30). The unlocking cam (40) is fixed to the backrest. The control lever (30) has a deactivated state in which the unlocking cam (40) moves past the control lever (30) at a distance during the pivoting of the backrest (4) and an activated state in which the unlocking cam (40) is seated against the control lever (30) and acts thereon during the pivoting of the backrest (4).

9 Claims, 4 Drawing Sheets

(56) References Cited

U.S. PATENT DOCUMENTS

| | | | |
|---|---|---|---|
| 2003/0080601 A1* | 5/2003 | Charras et al. | 297/378.12 |
| 2008/0309136 A1* | 12/2008 | Kojima et al. | 297/340 |
| 2009/0167046 A1* | 7/2009 | Yamagishi | 297/340 X |
| 2009/0167068 A1* | 7/2009 | Yamagishi | 297/340 |

FOREIGN PATENT DOCUMENTS

| | | |
|---|---|---|
| JP | 2003-182416 A | 7/2003 |
| JP | 2010-052529 A | 3/2010 |
| KR | 2003-0037734 A | 5/2003 |

\* cited by examiner

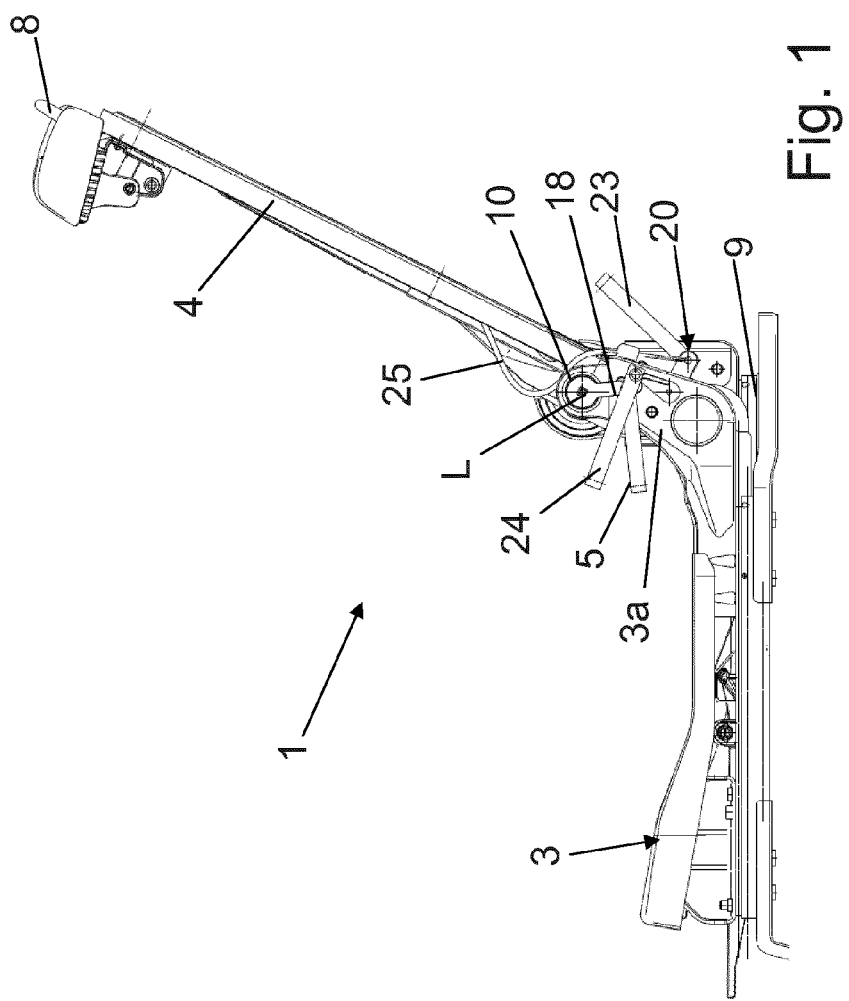

VEHICLE SEAT, IN PARTICULAR MOTOR VEHICLE SEAT

CROSS REFERENCE TO RELATED APPLICATIONS

This application is a United States National Phase Application of International Application PCT/EP2012/061488 filed Jun. 15, 2012 and claims the benefit of priority under 35 U.S.C. §119 of German Patent Application DE 10 2011 105 360.7 filed Jun. 21, 2011, the entire contents of which are incorporated herein by reference.

FIELD OF THE INVENTION

The invention relates to a vehicle seat, in particular a motor vehicle that includes a seat member, a backrest able to be pivoted about a backrest axis, seat rails for adjusting the longitudinal seat position of the vehicle seat, a control lever for unlocking the seat rails and which is pivotably supported on the seat member and an unlocking cam which is secured to the backrest for acting on the control lever.

BACKGROUND OF THE INVENTION

U.S. Pat. No. 6,641,218 B2 discloses a vehicle seat of the type mentioned in the introduction. If the backrest thereof is pivoted forward from a position for use, the unlocking cam which is secured to the backrest necessarily acts on the control lever which unlocks the seat rails. When a non-use position is reached, the unlocking cam releases the control lever again so that the seat rails lock again.

DE 197 15 764 A1 describes an inclination adjustment fitting having a pivoting release device for backrests of seats, in particular motor vehicle seats, in which an adjustable fitting member which is secured to the backrest is connected to a fitting member which is secured to a seat member via an adjustment and fixing device, the locking and fixing device comprising a plate which can be adjusted by means of an adjustment shaft in accordance with the desired seat inclination. In order to form the pivoting release device, this plate has at the outer periphery thereof a tooth segment in which there engages a locking detent which is supported on the fitting member secured to the backrest and which is in engagement with a control lever which can be actuated in the release direction and which returns itself in the locking direction. In order to form a compact device for pivoting release and forward displacement of the seat in order to enable unimpeded access to the rear of two-door passenger vehicles, the control lever is coupled to a detent lever which, when the fitting member which is secured to the backrest is released by pivoting on an actuation lever which is supported on the adjustable plate in the direction of the unlocking, engages with a longitudinal position adjustment device which is arranged between the seat member and the vehicle base.

DE 10 2008 061 037 B3 describes a vehicle seat having a backrest which is adjustable in terms of inclination, in particular with electromotive backrest inclination adjustment, which can take up an "Easy Entry position" in which the longitudinally adjustable vehicle seat is arranged in a front position and the pivoted and released backrest is pivoted forward, a backrest unlocking mechanism for unlocking the backrest for pivoting release, a rail unlocking mechanism for adjusting the longitudinal position of the vehicle seat and a coupling device for coupling the actuation of the backrest unlocking mechanism and the rail unlocking mechanism in order to take up the "Easy Entry position", part of the coupling device being a detent arrangement which has a lever which is arranged so as to be able to be pivoted about an axis, the lever being formed by two regions which can be changed relative to each other in terms of their position.

SUMMARY OF THE INVENTION

An object of the invention is to provide higher functionality in a vehicle seat of the type mentioned in the introduction.

According to the invention a vehicle seat is provided, in particular a motor vehicle that includes a seat member is provided. The seat comprises a seat member, a backrest able to be pivoted about a backrest axis, seat rails for adjusting the longitudinal seat position of the vehicle seat, a control lever for unlocking the seat rails and which is pivotably supported on the seat member and an unlocking cam which is secured to the backrest for acting on the control lever. The control lever has a deactivated state in which the unlocking cam moves past the control lever with spacing during the pivoting of the backrest, and an activated state in which the unlocking cam moves into abutment with the control lever and acts on the control lever during the pivoting of the backrest. The control lever has a first control arm, the actuation of which moves the control lever from the deactivated state into the activated state, and a second control arm which protrudes into the pivot range of the unlocking cam in the activated state.

The two states of the control lever determine whether or not the seat rails are unlocked when the backrest is pivoted forward. With the selection of the state of the control lever, a decision is thus made between two functions. In order to move the control lever from the deactivated state into the activated state, there is preferably provided a lever unit which can act on the control lever accordingly. The lever unit in turn is preferably moved by one or optionally more actuation elements. In addition, there exists a coupling with respect to the unlocking mechanism of the fittings, by means of which the backrest is fitted to the seat member. If a fitting is intended to be provided at only one side of the vehicle seat, a joint which can be rotated about the backrest axis is fitted between the seat member and backrest at the other vehicle seat side. In order to pivot the backrest forward without unlocking the seat rails, the fittings are unlocked by means of a separate actuation element. The various actions and couplings of the levers which can be moved relative to each other are preferably achieved by the corresponding pivot ranges (that is to say, for each lever a circle sector) overlapping, that is to say, depending on the angular position of the levers, they touch each other and can roll on each other in accordance with the principle of a tooth arrangement.

The invention is explained in greater detail below with reference to an embodiment illustrated in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of the embodiment without upholstery;

DESCRIPTION OF THE PREFERRED EMBODIMENTS

Figure 3:
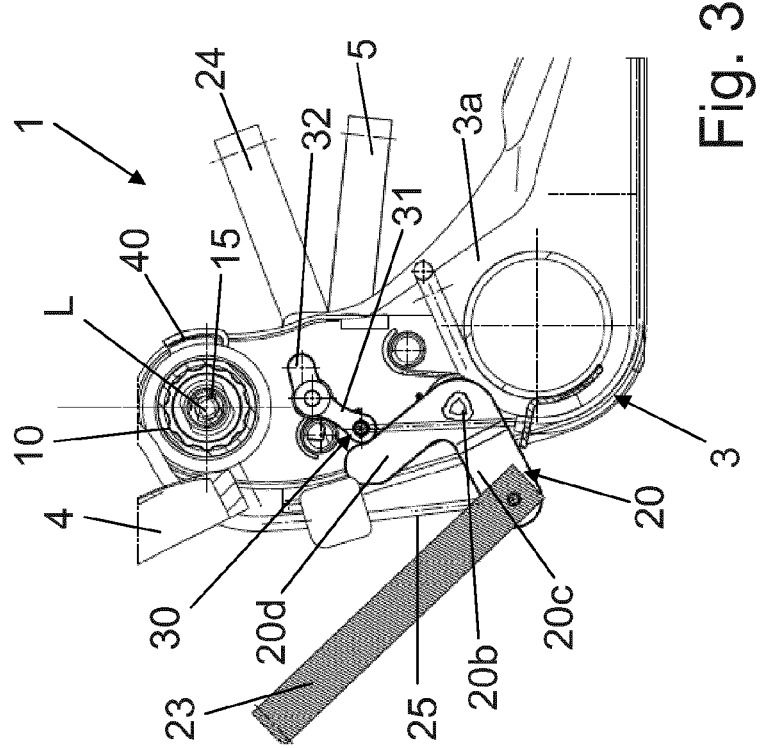
FIG. 3 is an inner view relating to FIG. 2.

Referring to the drawings in particular, a vehicle seat 1, in particular a motor vehicle seat for a rear, for example, second seat row of a motor vehicle, has a seat member 3 and a backrest 4 which can be pivoted relative thereto about a backrest pivot axis L. The arrangement of the vehicle seat 1 inside the motor vehicle and the conventional travel direction thereof define the directional indications used. By actuating a first actuation element 5, for example, a hand lever or a handle strap, the inclination of the backrest 4 can be adjusted relative to the seat member 3 between various positions for use. By actuating a second actuation element 8, for example, a handle, the backrest 4 can be pivoted into a non-use position, for example, a pivoted and released position in which the backrest 4 which is pivoted forward facilitates access to a rear seat row. The longitudinal seat position of the vehicle seat 1 can be adjusted by means of seat rails 9 which are provided on the seat member 3. The seat rails 9 are preferably also unlocked during the pivoting release operation so that the vehicle seat 1 as a whole can be pushed forward.

The inclination adjustment and the pivoting release operation of the backrest 4 is carried out by means of fittings 10, by means of which the backrest 4 is fitted to the seat member 3. The fitting 10 has two fitting members which can be rotated relative to each other about the backrest axis L. One of the two fitting members is secured to a seat frame side portion 3a of the seat member 3, whilst the other fitting member is secured to the structure of the backrest 4. The fitting 10 is constructed in this instance as a catch fitting, as described, for example, in DE 20 2009 016 989 U1, the disclosure content of which is expressly incorporated herein by reference. In such a fitting 10, the two fitting members can be locked to each other. The unlocking is carried out by means of an unlocking shaft 15 which is in alignment with the backrest axis L and can be rotated about it. The unlocking shaft 15 engages in a rotationally secure manner at both vehicle seat sides (or with a free travel in the peripheral direction) in a carrier which is arranged centrally and which is rotatably supported in the fitting 10, respectively, and whose rotation opens the locking in the fitting 10. The first actuation element 5 engages on a single-arm fitting lever 18, which rests in a rotationally secure manner on the unlocking shaft 15.

At one vehicle seat side, a lever unit 20 is supported on the seat frame side portion 3a so as to be rotatable about a rotation axis which is offset parallel with the backrest axis L. The lever unit 20 has a first drive arm 20a at the outer side of the seat frame side portion 3a, a connection shaft 20b which is in alignment with the rotation axis of the lever unit and on which the first drive arm 20a rests in a rotationally secure manner and which leads to the inner side of the seat frame side portion 3a, a second drive arm 20c, which is arranged at the inner side of the seat frame side portion 3a and which rests on the connection shaft 20b in a rotationally secure manner, and an output arm 20d which is constructed integrally with the second drive arm 20c and which protrudes at an angle of slightly less than 90° therefrom. A third actuation element 23, in this instance a handle strap, is secured to the free end of the second drive arm 20c. A fourth actuation element 24, in this instance a handle strap, is secured to the free end of the first drive arm 20a. The second actuation element 8 which is arranged at the upper end of the backrest 4 is operationally connected to the lever unit 20 by means of a backrest cable 25, preferably a Bowden cable, whose sheath is supported on the seat frame side portion 3a. Preferably, the backrest cable 25 is secured together with the third actuation element 23 to the second drive arm 20c. Depending on requirements, the second actuation element 8 or the third actuation element 23 or the fourth actuation element 24 or a plurality thereof may be omitted. The lever unit 20 is arranged in such a manner that the pivot range (which defines a circle sector) of the first drive arm 20a overlaps with the pivot range (which defines a circle sector) of the fitting lever 18.

Approximately at the center between the backrest axis L and the rotation axis of the lever unit 20, which is in alignment with the connection shaft 20b, a control lever 30 is supported on the seat frame side portion 3a so as to be able to be rotated about a rotation axis which is offset parallel with the backrest axis L at the same vehicle seat side. The control lever 30 which is constructed with two arms has a first control arm 31 and a second control arm 32 which protrudes therefrom at an angle of slightly more than 120°. A rail cable 35, preferably a Bowden cable, the sheath of which is supported on the seat frame side portion 3a, is secured to the first control arm 31. The control lever 30, in a manner known per se, is operationally connected to the unlocking mechanism of the seat rails 9 by means of the seat cable 35. The control lever 30 is arranged in such a manner that the pivot range (which defines a circle sector) of the first control arm 31 overlaps with the pivot range (which defines a circle sector) of the output arm 20d. In a deactivated state of the control lever 30, the second control arm 32 is orientated substantially tangentially relative to the fitting 10. In an activated state of the control lever 30, the second control arm 32 is orientated substantially radially relative to the backrest axis L.

At the same vehicle seat side there is provided an unlocking cam 40, which is fixed to the backrest, that is to say, is securely connected to the backrest 4, for example, by being secured to the fitting member of the fitting 10 that is itself secured to the backrest 4. The unlocking cam 40 extends in a peripheral direction over an angle of approximately 60°. The radial dimension of the unlocking cam 40 with respect to the backrest axis L is selected in such a manner that its pivot range overlaps with the pivot range of the second control arm 32. In the activated state of the control lever 30, the second control arm 32 protrudes into the pivot range of the unlocking cam 40. With respect to forward pivoting of the backrest 4, the unlocking cam 40 has a leading end and a trailing end.

Figure 2:
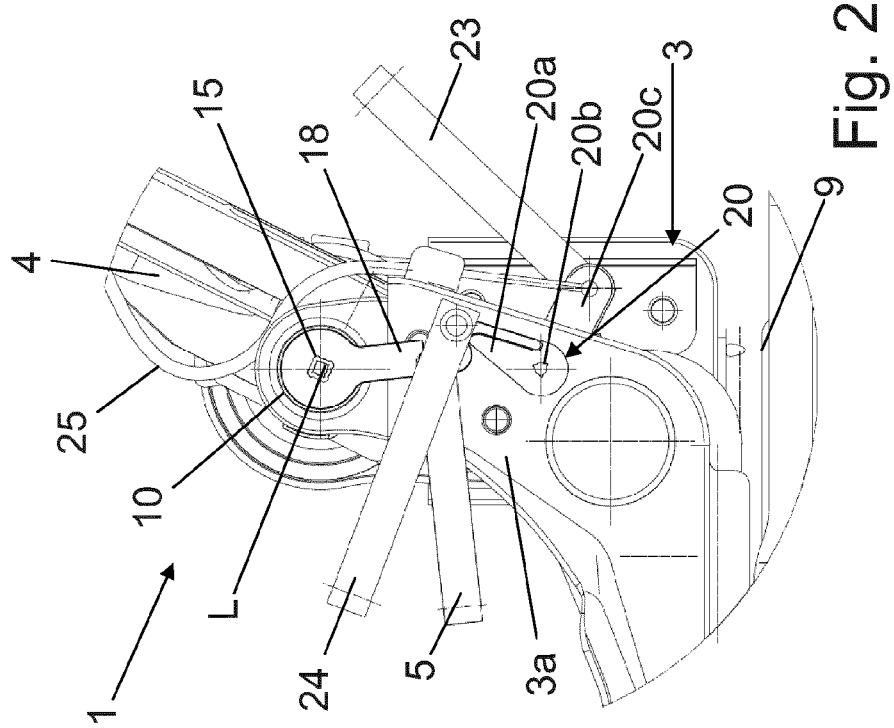
FIG. 2 is an outer view of the rear end of the seat member with the lower end of the backrest.

In the initial position of the components mentioned, the backrest 4 is in one of a plurality of possible positions for use which are suitable for seat use (FIGS. 1 to 3). The inclination adjustment of the backrest 4 is carried out by means of actuation of the first actuation element 5. If this is manually acted on by the user of the vehicle seat 1, it in turn acts on the fitting lever 18 and pivots it. The pivoting fitting lever 18 rotates the unlocking shaft 15, which unlocks the fittings 10 at both vehicle seat sides. The backrest 4 can now be pivoted into another position for use. If the first actuation element 5 is released, the fittings 10 lock automatically and thereby rotate the unlocking shaft 15 together with the fitting lever 18 back into the initial position. The vehicle seat may also be moved from a position for use into a non-use position which is constructed as a table-like position and which is suitable for increasing the storage space. The first actuation element 5 is also acted on manually at that time, whereby the fittings 10 are unlocked in the manner described above. The backrest 4 is now pivoted forward until it rests on the seat member 3. The rear side of the backrest 4 is orientated approximately horizontally in this table-like position. Whilst the backrest 4 is being pivoted, the unlocking cam 40 moves past with spacing relative to the second control arm 32 of the control lever 30, which is in the deactivated state.

Figure 5:
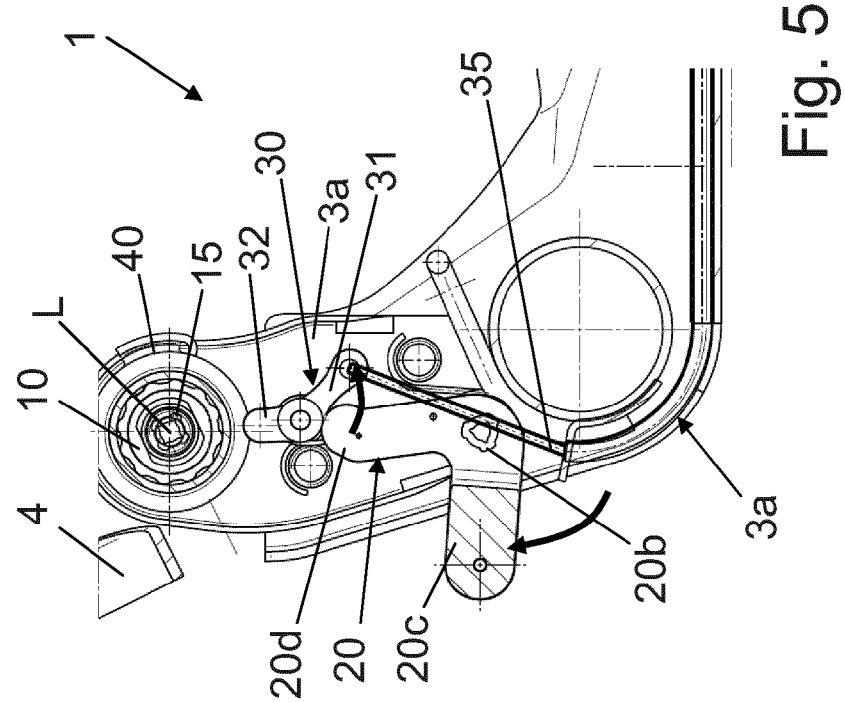
FIG. 5 is a view corresponding to FIG. 3 when the control lever is actuated for the pivoting release operation.
Figure 4:
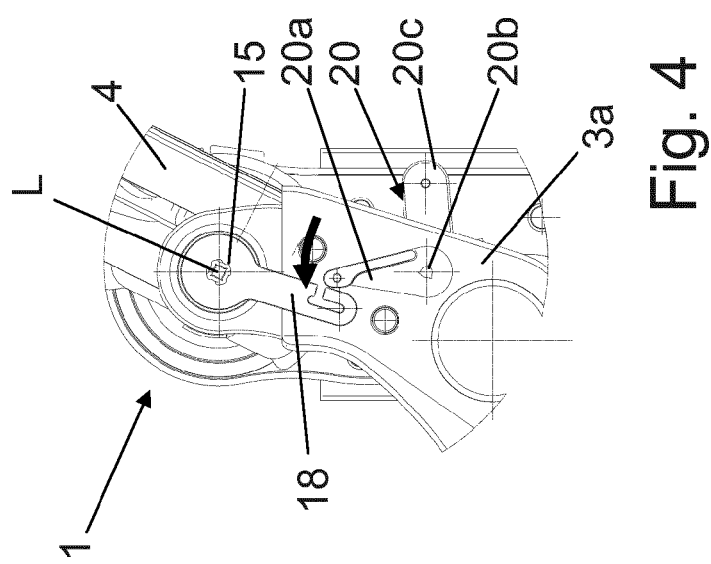
FIG. 4 is a part-view of FIG. 2 when the fittings are unlocked for the pivoting release operation.
Figure 6:
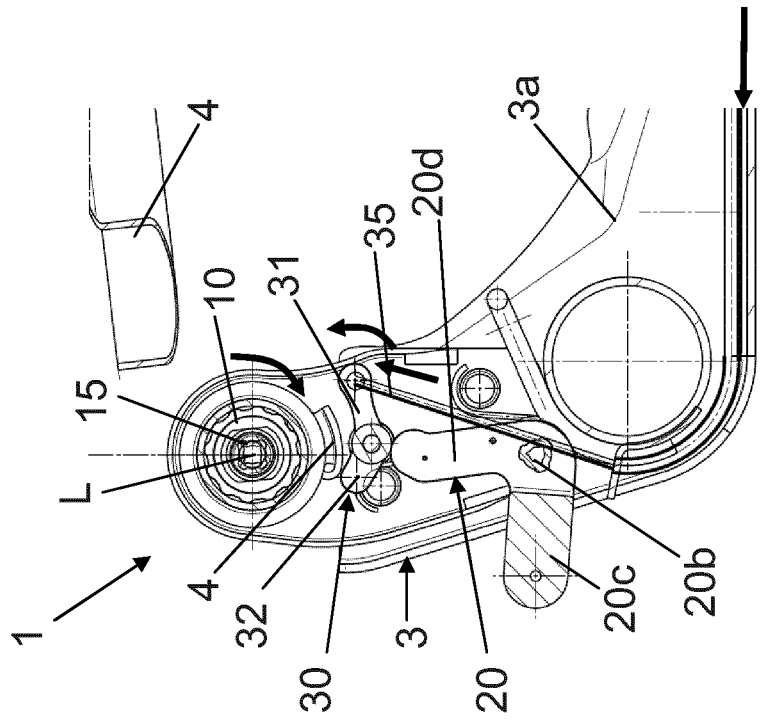
FIG. 6 is a view corresponding to FIG. 5 when the backrest is pivoted during the pivoting release operation.
Figure 7:
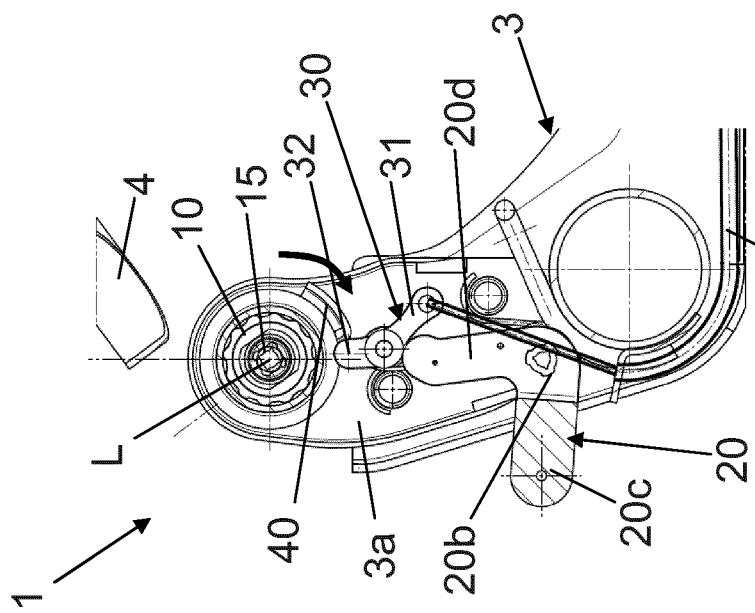
FIG. 7 is a view corresponding to FIG. 6 when the seat rails are unlocked during the pivoting release operation.

If access to a seat row which is located behind the vehicle seat 1 is intended to be facilitated, the backrest 4 is pivoted and released (FIGS. 4 to 7). In order to actuate the pivoting release operation, the user has a plurality of actuation possibilities. The user can manually act on the second actuation element 8 at the upper end of the backrest 4 or the fourth actuation element 24 which protrudes forward in the transition region relative to the seat member 3 or the third actuation element 23 which protrudes backward at that location. The last element is provided for the occupants of the seat row located behind the vehicle seat 1. The actuation element 8, 23 or 24 acted on pivots the lever unit 20. On the one hand, the first drive arm 20a of the pivoting lever unit 20 acts on the fitting lever 18, whereby the fittings 10 are unlocked (FIG. 4). On the other hand, the output arm 20d of the pivoting lever unit 20 acts on the control lever 30, which changes from the deactivated state to the activated state, that is to say, is activated (FIG. 5). Although the rail cable 35 is tensioned, the seat rails 9 are not yet unlocked. If the backrest 4 is pivoted forward, the unlocking cam 40 moves with the leading end thereof into abutment with the activated control lever 30, that is to say, the second control arm 32 (FIG. 6). When the backrest 4 is pivoted further, the unlocking cam 40 acts on the control lever 30, whereby it is pivoted to such an extent that the rail cable 35 unlocks the seat rails 9 (FIG. 7). The vehicle seat 1 can now be displaced as a whole.

The trailing end of the unlocking cam 40 may or may not pass the control lever 30 depending on the construction. If it can pass, there is insufficient action on the rail cable 35 for the seat rails 9 to lock and themselves act on the rail cable 35. The control lever 30 thereby pivots backward until it is again in abutment with the lever unit 20. If the actuation element 8, 23 or 24 which is acted on is still retained, the control lever 30 returns to an activated state. If the actuation element 8, 23 or 24 acted on has been temporarily released, the control lever 30 returns to the deactivated state.

For the backward pivoting of the backrest 4, the actuation element 8, 23 or 24 must be acted on so that the fittings 10 (and the seat rails 9) are unlocked. Alternatively, the fittings 10 are retained in an unlocked state by means of an (internal) guiding path, as disclosed, for example, in DE 199 28 148 A1, the disclosure content of which is expressly incorporated herein by reference. When the backrest 4 is pivoted backward, the unlocking cam 40 is released from the control lever 30 so that it again moves into abutment with the lever unit 20, but is still in the active state. The seat rails 9 are locked again. When the actuation element 8, 23 or 24 acted on is released in the desired position for use of the backrest 4, the lever unit 20 returns to the initial position thereof and the control lever 30 returns to the deactivated state.

Apart from the above-mentioned possibilities of releasing the backrest 4 by pivoting, the user also has the possibility of pivoting release without displacing the vehicle seat 1 as a whole by acting on the first actuation element 5. The operation then corresponds to the inclination adjustment of the backrest 4.

While specific embodiments of the invention have been shown and described in detail to illustrate the application of the principles of the invention, it will be understood that the invention may be embodied otherwise without departing from such principles.

The invention claimed is:

1. A vehicle seat comprising:
   a seat member;
   a backrest fitted to the seat member so as to be able to be pivoted about a backrest axis;
   seat rails for adjusting the longitudinal seat position of the vehicle seat, the seat rails being provided on the seat member;
   a control lever for unlocking the seat rails, the control lever being pivotably supported on the seat member; and
   an unlocking cam secured to the backrest for acting on the control lever, the control lever having a deactivated state in which the unlocking cam moves past the control lever with spacing during a pivoting of the backrest, and an activated state in which the unlocking cam moves into abutment with the control lever and acts on the control lever during the pivoting of the backrest, wherein the control lever has a first control arm, the actuation of which moves the control lever from the deactivated state into the activated state, and a second control arm which protrudes into a pivot range of the unlocking cam in the activated state.

2. The vehicle seat as claimed in claim 1, further comprising an unlocking shaft, wherein the backrest is pivotably fitted to the seat member by two fittings or by means of a fitting and a joint, the fittings or the fitting provided being able to be unlocked by means of the unlocking shaft which can be rotated about the backrest axis.

3. The vehicle seat as claimed in claim 2, wherein there is provided a first actuation element, the actuation of which acts on a fitting lever which rotates the unlocking shaft.

4. The vehicle seat as claimed in claim 3, wherein, when the first actuation element is actuated, the control lever remains in the deactivated state.

5. The vehicle seat as claimed in claim 1, wherein the control lever is in the deactivated state in an initial position and when the inclination of the backrest is adjusted and, during the pivoting release operation of the backrest, is in the activated state.

6. The vehicle seat as claimed in claim 1, further comprising a lever unit pivotably supported on the seat member, the lever unit having an output arm which, when the lever unit is pivoted from an initial position, moves the control lever from the deactivated state into the activated state.

7. The vehicle seat as claimed in claim 6, wherein the lever unit has a first drive arm by means of which the lever unit acts on a fitting lever during pivoting from the initial position.

8. The vehicle seat as claimed in claim 7, wherein the lever unit has a second drive arm to which a second actuation element is operationally connected in order to pivot the lever unit when the second actuation element is actuated.

9. The vehicle seat as claimed in claim 8, wherein there is provided a third actuation element which is operationally connected to the first drive arm or the second drive arm in order to pivot a lever unit when the third actuation element is actuated.

\* \* \* \* \*